United States Patent [19]

Hewson

[11] Patent Number: 5,664,460
[45] Date of Patent: Sep. 9, 1997

[54] CABLE CONTROLLER

[75] Inventor: Clifford Bruce Hewson, West Vancouver, Canada

[73] Assignee: Foreign Developments Limited, Burnaby, Canada

[21] Appl. No.: 555,462

[22] Filed: Nov. 13, 1995

[51] Int. Cl.$^6$ ..................................................... F16C 1/10
[52] U.S. Cl. .......................... 74/502.2; 74/48.9; 74/529; 74/526; 74/563; 74/567
[58] Field of Search ................................. 74/502.2, 489, 74/525, 527, 526, 529, 501.5 R, 502, 504, 523, 567, 540, 569

[56] References Cited

U.S. PATENT DOCUMENTS

| | | | |
|---|---|---|---|
| 3,789,645 | 2/1974 | Schmid | 74/491 |
| 4,232,565 | 11/1980 | Leonheart | 74/489 |
| 5,448,927 | 9/1995 | Lumpkin | 74/502.2 |
| 5,537,891 | 7/1996 | Nagano et al. | 74/525 |

FOREIGN PATENT DOCUMENTS

| | | | |
|---|---|---|---|
| 0435248A2 | 7/1991 | European Pat. Off. | 74/502.2 |
| 1210326 | 3/1960 | France | 74/502.2 |

*Primary Examiner*—Vinh T. Luong
*Attorney, Agent, or Firm*—C. A. Rowley

[57] ABSTRACT

A cable controller is formed by a housing having a cavity into which one end of a handle is received and mounted for a pivotal movement on a pivot pin extending across the housing. The pivot pin is received within a L-shaped slot adjacent to one end and the top of the handle and an abutment is provided projecting outwardly from the bottom of the handle in position to engage the rim of the cavity. A control cable is connected to the handle positioned about midway between the abutment and the slot. The slot and the abutment are positioned so that movement of the handle in a first direction pivots the handle about the pivot pin and extends the cable and movement of the handle in the opposite direction pivots the handle about the point of contact between the abutment and the rim of housing to move the pin along the slot into a short section of the L-shaped slot to thereby extend the cable now lock the handle in a parking position.

2 Claims, 2 Drawing Sheets

CABLE CONTROLLER

FIELD OF INVENTION

The present invention relates to a cable controller, more particularly, the present invention relates to a lever type cable controller, lockable in a parked position.

BACKGROUND OF THE INVENTION

The concept of using a manipulatable grip or handle to extend or retract the cable, for example, for controlling the application of brakes on a vehicle such as a bicycle or wheel type walker, are well known. When the cable brake system is used on a walker or similar devices it is necessary to be able to lock the brake in an applied or on position for parking the walker.

U.S. Pat. No. 5,279,180 provides an example of one form of lever mechanism used for this purpose. This device requires several articulated parts contained within a cavity in a housing including a lever arm pivotably connected adjacent to one end thereof to the housing and a control handle or arm pivotably connected to the lever spaced from the pivotal connection to the housing. Manipulating the arm in one direction causes pivoting around a pivotal connection between the lever and housing and movement in a second direction opposite to the first direction causes pivotal movement at both the pivotal connection of the lever to the housing and the pivotal connection between the arm and the lever. A locking element positioned within the cavity adjacent to the point of entry of the cable cooperates with the a locking surface at one end of the arm when the arm is pivoted in a second direction to interlock the mechanism in a parked position.

The use of several pivot points and parts and burying of the locking mechanism well within the cavity renders this device relatively complicated.

BRIEF DESCRIPTION OF THE PRESENT INVENTION

It is an object of the present invention to provide a simplified form of cable manipulator that may be locked in a parked position.

Briefly, the present invention relates to a cable controller comprising a housing, a cavity in said housing, said cavity having an open side permitting access into said cavity, a manipulating handle, said manipulating handle having a manipulating end and a control end, said control end being received within said cavity and said manipulating end projecting therefrom., a substantially L-shaped slot through said control end, said slot being positioned adjacent to a top edge of said handle, said slot having a long section and a short section, said short section extending from said long section toward said top end being at the end of said slot remote from said manipulating end, a pivot pin extending through said slot and mounting said manipulating handle in said cavity, an abutment means projecting from a bottom edge of said control end, said abutment being in a position to contact a rim of said cavity when said handle is moved in a first direction and away from said rim when said handle is pivoted around said pivot pin by movement in a second direction, said long section of said slot being oriented to permit relative movement of said pivot pin along said long section of said slot to said short section when said handle is moved in said first direction about a point of contact between said abutment and said rim, said cavity being relatively shaped to permit said abutment to move along said rim as handle and said housing are relatively moved to position said pivot pin into said short section and thereby lock said handle in a parking position, means for introducing said cable into said cavity and for connecting said cable to said handle between said slot and said abutment.

Preferably movement of said handle in said second direction positions said pivot pin at and end of said long section remote from said short section.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

Figure 1:
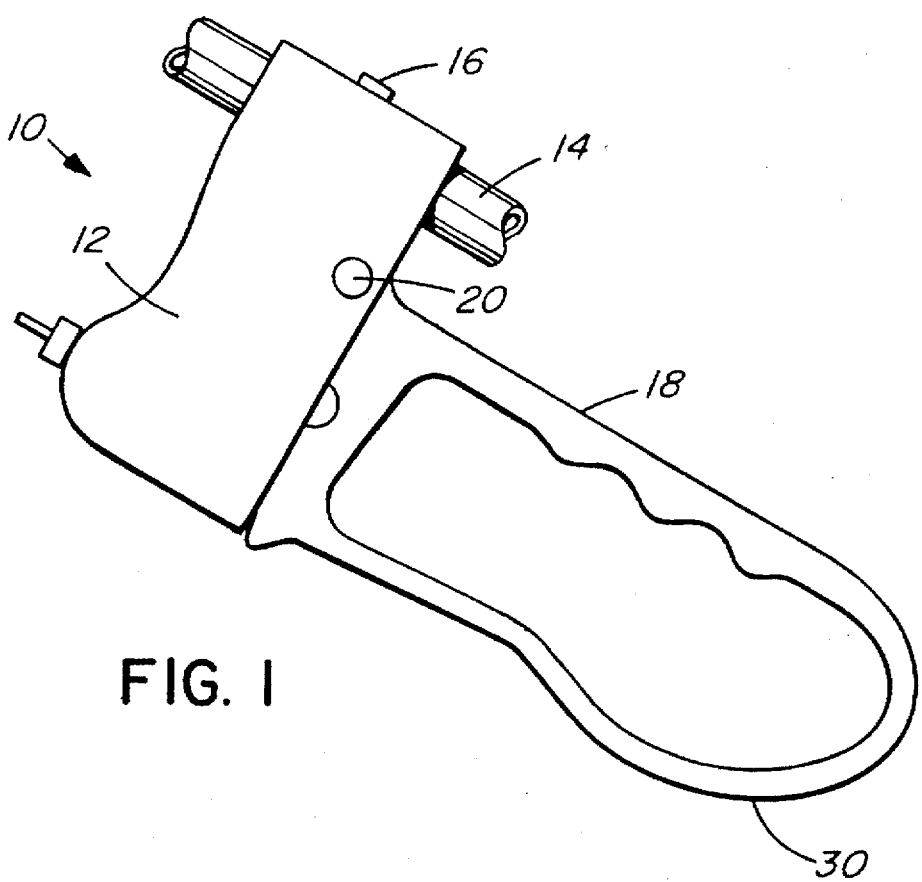
FIG. 1 is a side elevation illustrating cable controller constructed in accordance with the present invention.

As shown, in FIG. 1, the manipulator 10 of the present invention comprises a housing member 12 mounted on a handle bar or the like 14 passing through a passage 15 (see FIGS. 2, 3 or 4) and held in position by a clamping screw or the like 16. The control device 10 includes a handle 18 pivotably mounted on a pivot pin 20 within an open cavity 22 formed in the housing 12. The cavity 22 has an outer rim 24 defining the inlet to the cavity.

Figure 2:
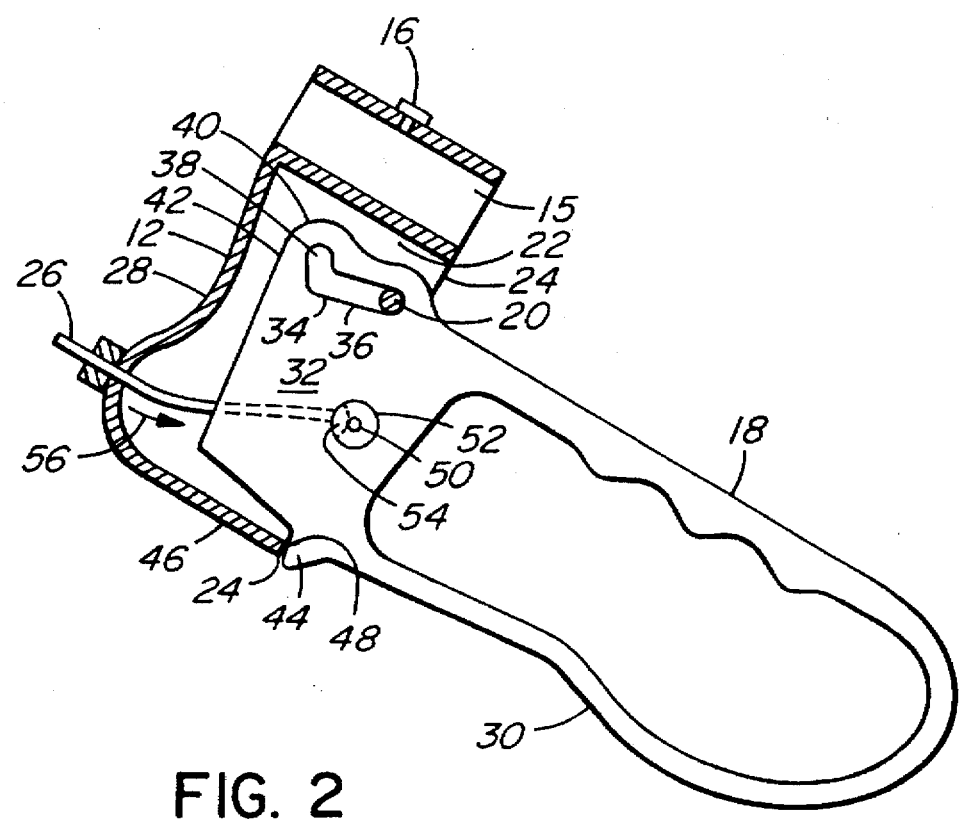
FIG. 2 is a view similar to FIG. 1 but showing the housing portion cut away to illustrate the operation of the system and with the cable in relaxed position.
Figure 3:
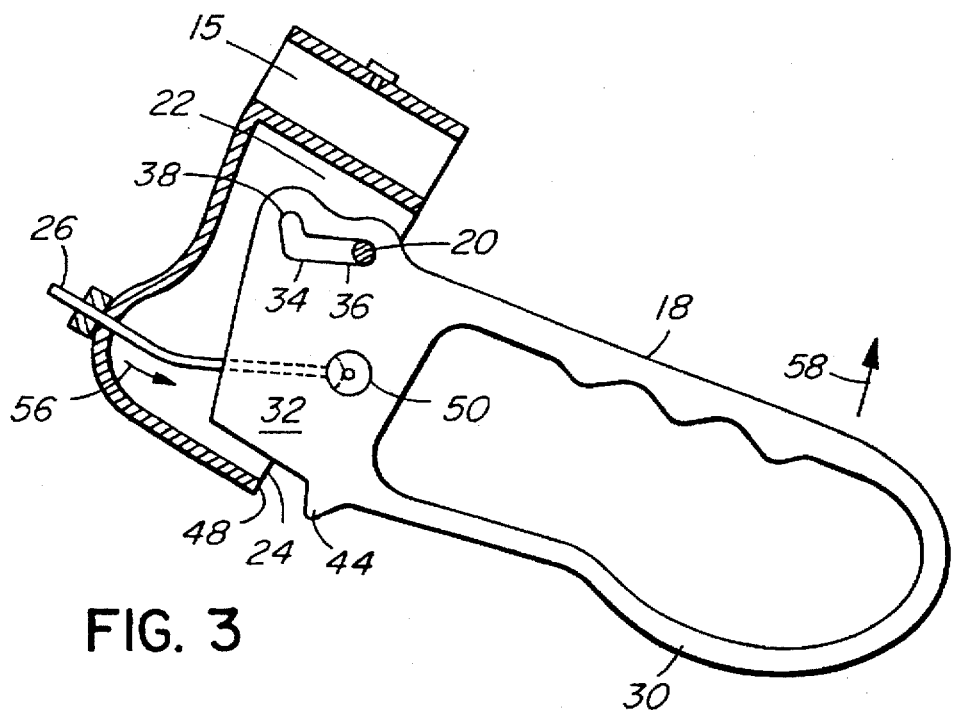
FIG. 3 is a view similar to FIG. 2 but showing the handle in a actuating position with the cable extended.
Figure 4:
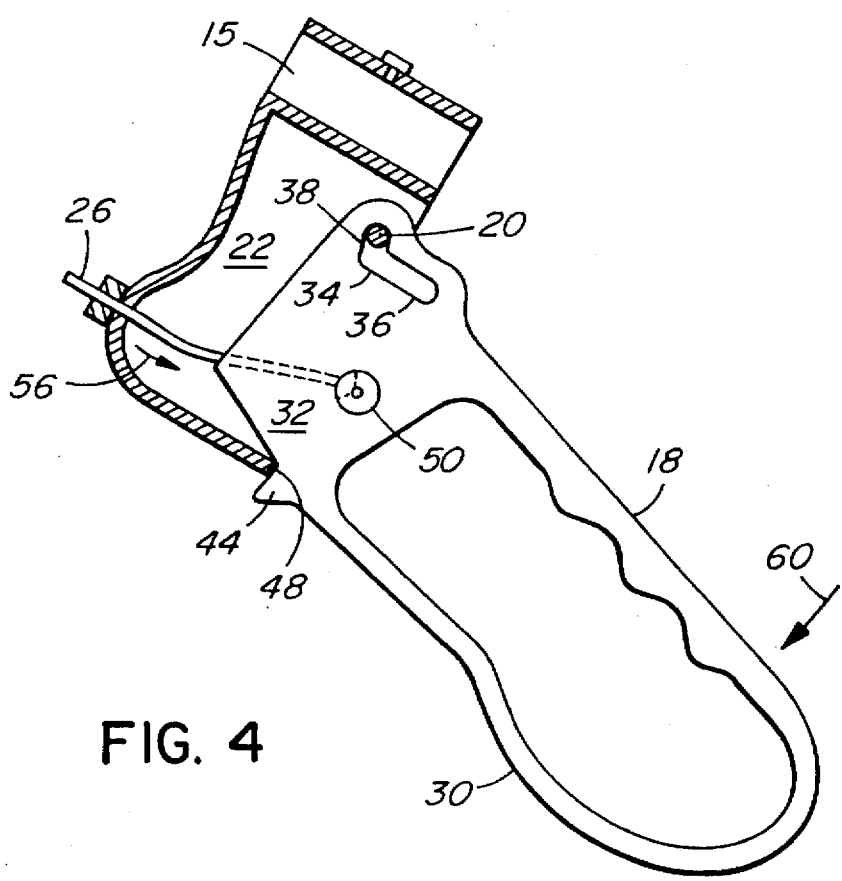
FIG. 4 is a view similar to FIGS. 2 and 3 but showing the handle in a park position with the cable extended.

As shown in FIGS. 2 to 4, a cable 26 extends through a bottom wall 28, i.e. the wall of the cavity remote from the rim 24 into the cavity 22 and is connected to the arm 18 as will be described hereinbelow.

As shown in FIGS. 2, 3 and 4, the manipulator handle 18 has a manipulating end 30 that projects from the cavity 22 in the form of a loop through which a hand may be passed to control movement of the handle 18 and a control end 32 that projects into the cavity 22. The control end 32 is provided with a L-shaped slot 34 having a long section 36 and a short section 38 at the end of the long section remote from the manipulating end 30. The short section 38 is substantially perpendicular to the long section 36. The slot 34 is positioned adjacent to a top edge 40 and the front end 42 of the section 32, i.e. the end of the section 32 remote from the manipulative handle end 30.

An abutment 44 is provided at the side of the section 32 remote from the top edge 40, i.e. is on the bottom side or wall 46 of the portion 32 and, as illustrated in FIG. 2, is in a positioned to contact the rim 24 as indicated at 48 when the cable 26 is in neutral or relaxed position as shown in FIG. 2 i.e. the cable 26 is not extendible.

As above indicated, the cable 26 is connected in any suitable manner to the handle 18. In the illustrated system the end 50 of the cable 26 is retained in a cavity 52 in the arm 18 by a suitable retainer 54. The cavity 54 is positioned spaced from and between the slot 34 and the abutment 44, preferably, substantially midway between slot 34 and abutment 44 so that movement of the handle 18 in either direction by pivoting around pin 20 or the contact point 48, i.e. up or down, causes extension of the cable 26 to extend as will be described hereinbelow.

The controller is shown in a neutral position in FIG. 2 wherein the cable 26 is not being extended or pulled in the direction of the arrow 56 so that if the end of the cable 26 were connected to a brake (not shown) of a vehicle such as a walker or bicycle, the brake would be in a released position.

The cable 26 may be extended, for example to apply the brake, the handle 18 is moved in the direction of the arrow 58 (see FIG. 3) to pivot the handle 18 above the pivot pin 20, move the abutment 44 away from the contact point 48 with the rim 24 and extend the cable 26 by movement of cavity 52 in which the end 50 of the cable 26 is held by the retainer 54 in the direction of the arrow 56.

It will be noted that the pivot pin 20 is at the end along section 36 of the slot 34 remote from the short section 38, i.e. is at the end of the slot 36 adjacent to the handle portion 30 and that the handle 18 is in effect pivots around the pivot 20 so that when it is released, the spring force or the like in the cable 26 tends to return the cable 26 to its normal position which moves the handle 18 in the direction opposite to the direction 58 to move the abutment 44 back into contact with the rim 24 at contact point 48, i.e. to move the handle 18 back into the position shown in FIG. 2.

The controller is moved into a park position as shown in FIG. 4 by moving the handle 18 in the direction of the arrow 60 which pivots the handle 18 about the point of contact 48, relatively moves the pin 20 along the long section 35 of the slot 34 and eventually into the short section 38 of the slot 34. Movement of the handle 18 moves the slot 34 to position the pin 20 into the section 38 by sliding the abutment 44 downward along the rim 24 so that the contact point 48 between the rim 24 and abutment 44 moves closer to the base of the abutment 44. This movement of the handle 18 extends the cable 26 in the direction of the arrow 56 and locks the handle 18 in this position with the cable 26 extended. A positive force in the direction of the arrow 58 (see FIG. 3) is required to release the pin 20 from the short section 38 and move it into the long section 36 where the tension (spring force) in the cable 26 can pivot the handle 18 on the point of contact 48 and permit relative movement of the slot 34 and pin 20 to position the pin at the end of the long section 36 of the slot 34 remote from the short section 38 and return the handle 18 to the position shown in FIG. 2.

It will be apparent that the mechanism of the present invention is relatively simple, yet permits easy application of tension to the cable 26 and permits locking the cable 26 under tension in a parked position as shown in FIG. 4. In the case, of a walker movement of the controller into the parked position shown in FIG. 4 permits parking of the walker with the brakes in activated or applied position.

Having described the invention, modifications will be evident to those skilled in the art without departing from the scope of the invention as defined in the appended claims.

We claim:

1. A cable controller comprising means defining a cavity, a manipulating handle, said manipulating handle having a manipulating end and a control end, said control end being received within said cavity and said manipulating end projecting outwardly therefrom, said control end having a first side edge and a second side edge forming a pair of opposite side edges of said control end a slot through said control end and positioned adjacent to said first side edge of said handle, said slot having a long section having a first end adjacent said manipulating end of said handle and a second end remote from said manipulating end of said handle and a short section, said short section extending at an angle from said second end of said long section of said slot toward said first side edge, a pivot pin extending through said slot to pivotably mount said manipulating handle in said cavity for pivotal movement about said pivot pin, an abutment means projecting from said second side edge of said control end of said handle, said abutment means projecting from said second edge in a direction away from said first edge and being located in a position relative to said cavity to contact a portion of a rim of said cavity when said handle is pivoted around said pivot pin in a first direction and away from said rim when said handle is pivoted around said pivot pin in a second direction opposite said first direction, said abutment means being positioned to cooperate with said portion of said rim to permit said handle to be pivoted about a point of contact of said abutment and said portion of said rim, said long section of said slot being shaped to permit movement of said pivot pin along said long section of said slot when said handle is pivoted about said point of contact to relatively move said pivot pin between said first and said second ends of said long section of said slot, cable means, means for connecting said cable means to said handle between said slot and said abutment in a position so that pivotal movement of said handle about said pivot pin or about said point of contact of said abutment with said rim portion changes an effective length of said cable means.

2. A cable controller as defined in claim 1 wherein said short section of said slot is positioned to receive said pivot pin when said handle is pivoted about said point of contact between said abutment means and said portion of said rim to position said pin at said second end of said slot and said abutment means and said cavity are shaped to permit said point of contact to shift and move said pivot pin into said short section of said slot thereby to releasably hold said handle in a fixed position relative to said cavity when said pin is received in said short section of said slot.

* * * * *